Nov. 4, 1952    J. S. HALE    2,616,266
DAM SPILLWAY AND METHOD OF OPERATING THE SAME
Filed Jan. 19, 1948    2 SHEETS—SHEET 2

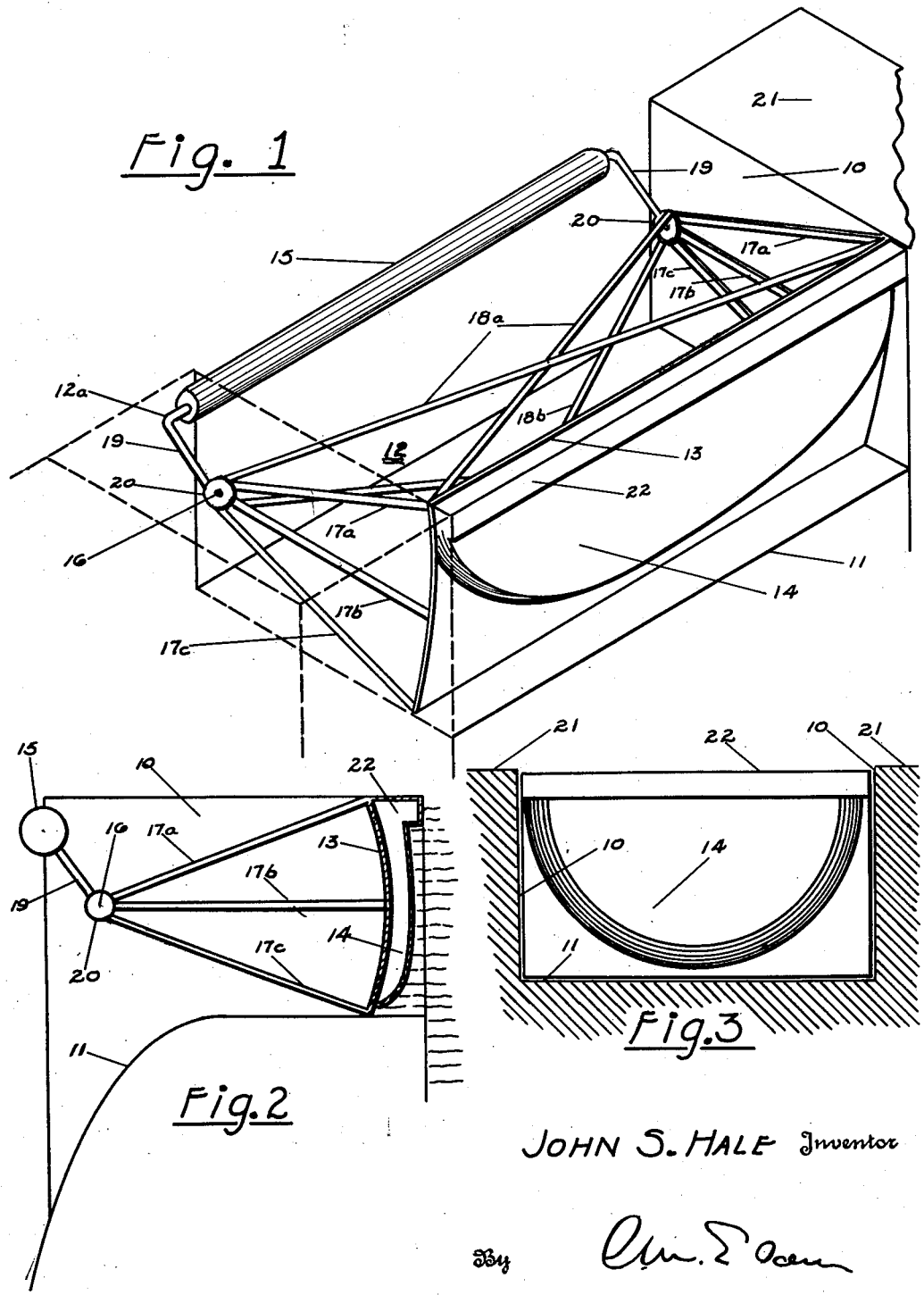

Inventor:
JOHN S. HALE
By C. U. Elean
Attorney

Patented Nov. 4, 1952

2,616,266

UNITED STATES PATENT OFFICE 2,616,266

DAM SPILLWAY AND METHOD OF OPERATING THE SAME

John S. Hale, Augusta County, near Staunton, Va.

Application January 19, 1948, Serial No. 3,157

5 Claims. (Cl. 61—25)

1

My invention relates to water control in movable bodies of water, and particularly concerns a novel form of spillway and associated gate assembly for automatically maintaining the head of said body of water constant between close limits. Additionally, my invention concerns a novel assembly of such spillway units, as well as the method of operating the same so as to achieve the aforementioned objectives.

An object of my invention is to provide a new spillway assembly which is simple, rugged, of comparatively low cost both from an initial and an operational standpoint, which is entirely automatic in operation and requires practically no manual supervision, and this only at most infrequent intervals; which, while sensitively responding in required close degree to wide variations in unit volume of inflowing water, nevertheless substantially avoids any tendency towards detrimental hunting, and which effectively operates to fulfill its intended purpose even upon partial failure of the operating mechanism; which assembly at the same time has no relatively moving parts, the assembly operating as a unit within the spillway opening.

Thus, within wide operational limits, my new automatic gate serves effectively, subject only to excessive depletion by load demands during prolonged dry spells, to maintain the water level substantially constant within close limits, regardless of wide variation in the flow of incoming water, be such flow only moderate or be it approaching flood or near-flood conditions.

Another object is to provide an assembly of such automatic gate units each of which serves effectively to come into operation in determined sequence, upon variation in the upstream water head, to maintain the required constant or nearly constant water level regardless of how widely may vary the volume of incoming water flowing from upstream into the holding basin controlled by the spillway system.

Still another object is to provide a novel method of operating a series of automatic spillway gates in such manner that in the entire absence of human supervision, the system will function sensitively, reliably and adequately to maintain constant within close limits, the water head in a reservoir or the like regardless of how widely may vary the unit volume of incoming water on the upstream side of the water basin.

Other objects and advantages will in part be obvious and in part pointed out hereinafter, during the course of the following description, taken in the light of the accompanying drawings.

2

My invention accordingly reside in the several parts, elements, features of construction and operational steps, as well as in the correlation and combination of each of the same with one or more of the others, the scope of the application of all of which is more fully set forth in the claims at the end of this specification.

In the several views of the drawings, wherein I have disclosed that embodiment of my invention which I prefer at present, and throughout the several views of which drawings like reference characters denote like parts, Figure 1 is a view, in perspective, of my new gate as associated with a conventional spillway;

Figure 2 is an end elevation of my gate, as associated with the spillway;

Figure 3 is a front elevation thereof, taken from the upstream side; while

Figure 4:
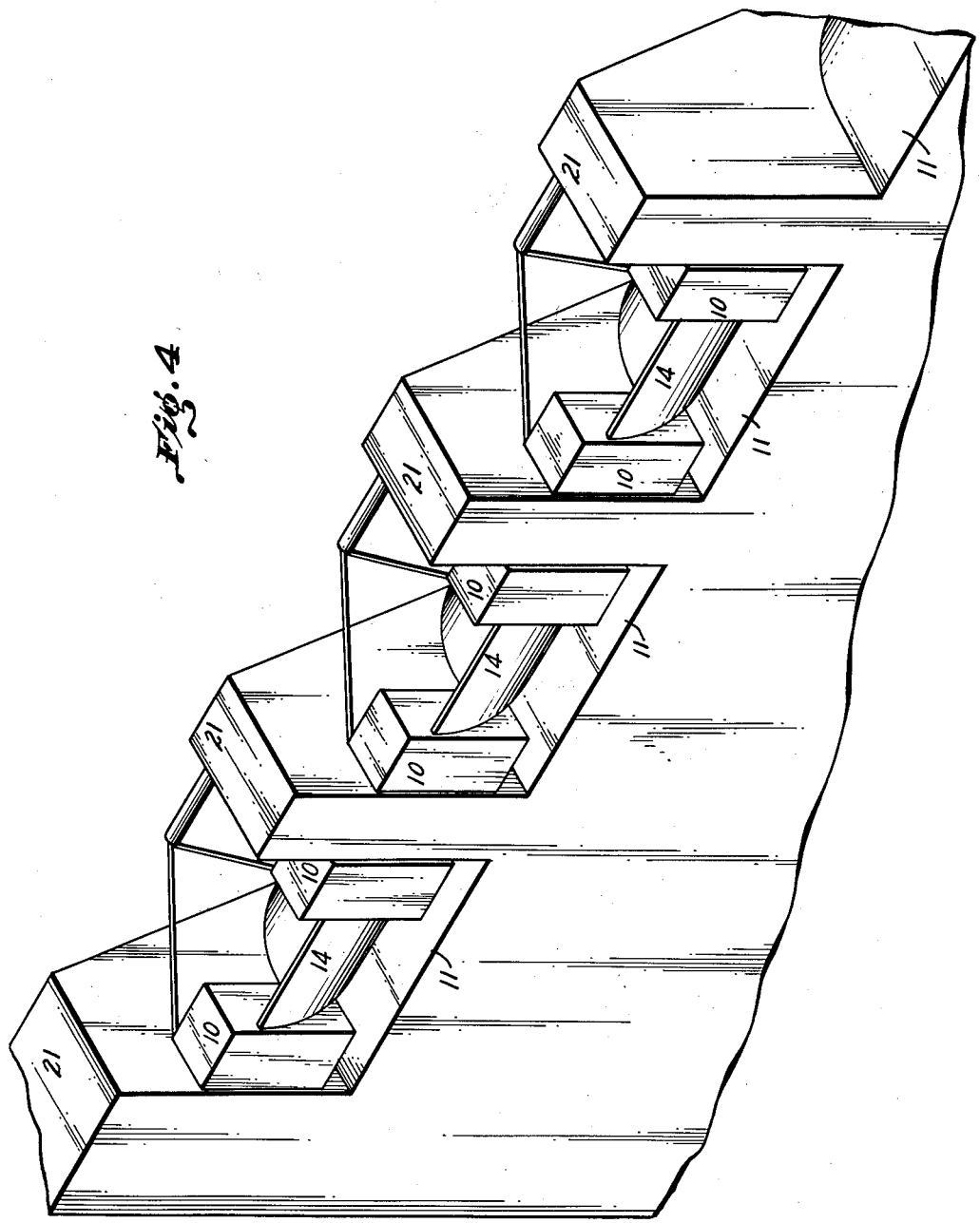

Figure 4 discloses in fragmentary perspective the multiple batteries of spillway gates following my new practice.

As conducive to a more thorough understanding of my invention, it may be noted at this point that it is now universally accepted in the design and construction of dams and other retaining elements serving to provide a reservoir or basin within which to impound water, to provide one or more spillways therein for the purpose of leading off surplus water which may result from sudden floods and the like. Particularly is this requisite in the instance of flash floods which so frequently occur in mountainous regions.

These spillways are provided to carry off excess water upon occurrence of excess influx of upstream water. The spillway is required in order to provide a designed freeboard between the water level in the reservoir and the top of the bulkhead of the dam. Adequate freeboard should be provided in order that the dam will be subjected only to designed maximum load conditions. It is undesirable to permit the water to flow freely across the crest of the dam, for to do so requires the exercise of economically unjustified constructional precautions to prevent damage between the dam and its abutments. While of course it is entirely possible to design a dam which will take care of any stipulated maximum flow of water across the crest of the dam, construction costs in such instances are entirely out of proportion, and an uneconomical, inefficient dam results. Again, it is entirely possible to leave the spillway unobstructed and with no gate of any sort controlling the same. This is likewise inefficient, however.

The spillway must be made sufficiently deep to carry off all excess water without danger of flow across the bulkhead of the dam. Thus baldly stated, and without more, this means that excessive freeboard must be provided, and either the crest of the dam raised above what is desirable; or, as more likely will be the case, the operating water level within the reservoir must be maintained lower than otherwise would be true, and the total holding capacity of the basin diminished appreciably from what it would be were the operating water level left high, to provide higher operating efficiencies and a greater holding basin for the impounded water.

To lessen the effective depth of the spillway, the practice has arisen of providing some sort of gate within the spillway to control the flow of water therethrough. When this is done, the normal water level can be permitted to rise above the bottom of the gate when the latter is closed, yet when the gate is opened to a required extent, adequate provision is made for running off excess water without danger of its crossing the crest of the dam. Lessened effective freeboard is thereby achieved.

The disadvantage of the use of manual gates, however, is that the constant attendance of operators for controlling the gates is required. For efficiency, nicety of control is obtained by sensitive adjustment in accordance with variations in load demand through the water tunnel or the like, and with variations in the head of the incoming upstream water.

Constant supervision, however, is frequently impossible where the installations are remote and small. Yet where the reservoirs are subjected to flash floods and the like, serious damage may be created, and in extreme conditions, the dam fail, before the attendants can reach the dam and regulate the gates.

For obvious reasons, therefore, considerable attention has been devoted within the art to the provision of automatic flood gates within the spillways of the dams. For one reason or another, however, these have not heretofore proved entirely satisfactory. Either they were too cumbersome, too expensive, too complicated, too fragile, or because of a multiplicity of moving parts, or for other reasons, proved not to provide the satisfactory operation, or display the durability and long life which are necessary for efficient service. For one reason or another, therefore, automatic spillways, desirable as they obviously are in theory, have not yet received widespread acclaim.

An important object of my invention, therefore, is to avoid in substantial measure the many aforementioned disadvantages and defects of the prior art and at the same time to produce a highly desirable, simple and rugged flood control gate for spillways and the like which, in the virtual absence of relatively moving parts, sensitively controls within narrow limits the water level within the upstream basin, regardless of wide variation in the volume of water flowing thereinto.

A further disadvantage of the automatic expedients heretofore suggested has been that should for any reason, through damage, deterioration, or the like, the automatic gate fail to operate, the regulatory safety elements for the dam will no longer be effective, and the dam will be at the mercy of the elements.

A further important object of my invention, therefore, is to provide safeguards for my new gate which will insure the proper operation of the gate for its intended purpose in satisfactory manner even though substantial damage may have been done thereto.

Finally, it has been observed in actual practice that while it is entirely possible to design a single spillway and control gate therefor which will adequately control the outflow of surface water, no matter how great (within practical limits) it may be, this involves a considerable element of expense.

A further important object of my invention, therefore, is the provision of a number of spillway openings in any given dam construction, for each gate control, which operate in automatic manner so that the gates will come sequentially into operation to provide highly sensitive control of the water level within the reservoir, and this at a minimum of over-all outlay, both initially and in subsequent operation, and with maximum simplicity of design of the entire retaining dam.

More precisely, my invention may be envisioned as comprising an automatic gate provided on a framework which is carried in suitable bearings within the spillway, the gate having the form of a segment of a cylinder with radius substantially equal to the width of the spillway opening, the center of the cylinder being coincident with the axis of rotation of the gate and the gate having its convex surface disposed outwardly in an upstream direction. A counterweight is provided on the opposite extremity of said framework, disposed at a convenient angle, suitably computed, either through logical or empirical means, at more than 90° but less than 180° from the gate element. This counterweight likewise extends substantially the length of the spillway opening, and is mounted on open arms comprising part of the supporting frame work for the gate, and movable with the gate so as to have a variable moment arm. The frame has generally the configuration of a bellcrank lever, the gate being mounted at the extremities of the long arms, and the counterweight being carried at the extremities of the short arms. The direction of force of this counterweight being opposite to that of the gate, the sum total of forces operating upon the frame, tending to turn the gate, comprises a couple plus a moment.

Provided on the upstream or the outer face of the gate, is a pontoon member of increasing cross-sectional area per unit increment of height across the face of the gate, thus giving rise to variable buoyancy. It is this pontoon which in large measure gives rise to the force comprising one moment of the displacing couple heretofore referred to. Finally, an emergency pontoon is applied across the entire upper face of the gate to insure that the latter breaks away from its lowermost or rest position, even should for some reason the gate fail to operate in its normally intended manner. For convenience, the two pontoons may be constructed as a single, integral unit.

A variant of my invention comprises a provision of a number of spillways across the face of the dam with the provision therein of a number of gates of different operating characteristics, one said gate being provided in each spillway. I prefer to provide that gate of quickest operating characteristics in the spillway overlying that portion of the downstream channel which normally carries the greatest volume of water. The other gates are provided of more sluggish operating characteristics so as to come into operation only as excess upstream water conditions require.

And now having reference more particularly to the embodiment of my invention disclosed in the several views of the drawings, it will be seen that the dam-crest is vertically indented with one or more spillways for leading off surplus waters. These spillways comprise side abutments 10 and an indented crest 11. Without further provision, the height of crest 11, which may be likened to the web of a U, in large measure determines the effective head of water on the upstream side of the dam. Thus, without more, the dam is inefficient to the extent that the height of the spillway abutment represents waste in materials and investment, and is ineffective so far as concerns any useful contribution to the holding action of the dam. In short, the amount of freeboard is excessive. Of course, the total cross-sectional area is sufficient to spill the estimated maximum of excess waters resulting from abnormal conditions, be they flash floods or those gradual in development. The requirement is that these spillways be sufficient in area to prevent the flood waters from topping the bulkhead of the dam, and if the estimated volume of these flood waters be in excess of that which can be spilled through a single spillway, then the number of such spillways is increased until the entire volume of excess waters can be handled.

If now, a gate be provided across such spillway, which can be opened upon flood conditions prevailing, then as has been suggested, a substantial part of the freeboard of the spillway abutment can be utilized in impounding the upstream waters. This will appreciably increase the effective height of the dam and greatly increase the effective volume of the holding basin serviced by the dam. For reasons hereinbefore stated, I desire to impart automatic operation to such a dam.

My gate comprises essentially a spider-like frame indicated generally at 12, a gate 13 having a main float 14 applied thereon, a counter-weight 15 offset relatively to the gate and an emergency pontoon 16 applied to the top of gate 13. The several elements are disposed in rigid and fixed relation relative to each other, and the ensemble is pivotally mounted as at 16, 16 to the abutments 10, 10 of the spillway.

As has been generally stated, the gate structure may be likened generally to a bell-crank lever, with the gate proper 13 disposed on the long, effective arm of the lever, and the counter-weight 15 disposed at the extremity of the short, balancing arm thereof.

Gate 13 may be contoured so as to present any desired and effective area to the waters on the upstream side of the dam. The essentials are that a substantially continuous and unbroken surface be presented, and that there be no sharp changes in contour which permit the pressure-impelled, impounded waters to initiate any attack on the structure of the gate. In the preferred embodiment here undergoing illustration, I shape the gate as a segment of an arc, convex upstream, struck about any convenient center providing a radius of sufficient length, the arc here being struck about the axis of the pivot points 16, 16. The gate may be formed of any suitable material such as wood, water-resistant metal or the like. If wood is employed, I sometimes find it advantageous to subject the wood preliminarily to some suitable and conventional treatment to seal the same against the attack of water.

As may be seen from Figures 1 and 2, I cross-brace the frame in desired suitable mannner. Thus the frame (Figure 1) comprises upper, center and lower arms 17a, 17b, 17c, 17a, 17b, 17c extending from each pivot pin 16, 16 to the upper, center and lower points of the corresponding near edge of the gate 13. Cross bracing 18a, 18b, 18a, 18b extend between the pivots 16, 16 to the corresponding upper and lower edges, respectively, of the ends of gate 13 opposite the respective pivots 16, 16. These brace or frame elements may be riveted, welded or otherwise secured together in any suitable manner. Moreover, they may have the gate 13 secured to them in any suitable, convenient and conventional manner.

Reference has been made to counter-weight 15 mounted on the short end of the bell-crank lever 12. Without undertaking at this time to go exhaustively into the purpose of this counter-weight, it is interesting to note that this counter-weight 15, formed of any suitable material of requisite density, such as metal, is mounted on shaft 12a, which, in turn, is carried at opposite ends on stub arms 19, 19, fast one to each hub portion 20, 20 at bearings 16, 16.

For the proper automatic operation of the gate it is necessary that controlled buoyancy be imparted to it, sufficient to cause its sensitive response to variations in the head of the upstream waters impounded therebehind. To this end I apply, as by bolting, or other suitable method, a main float 14 to the upstream face of gate 13. While this float may be constructed so as to be responsive in linear manner to variations in head of the impounded waters, I desire to impart a greater initial response to the gate, with decrease in rate of response upon increase in upstream head. Accordingly, I impart a modified semi-circular contour to the pontoon or float 14 with base uppermost and apex lowermost.

With this construction of the gate 13 and float 14 on the one hand and of the counter-weight 15 on the other hand, the two cooperate to impart sensitive gate action. Thus, the gate is opened by a force couple which consists of two moments, each variable in itself. One of these comprises the counter-weight 15 acting through a variable moment arm comprising the horizontal projection of arm 19 as it swings through a vertical angle, and the other comprising the moment arm 17a, 17b, 17c, etc., varying as it swings through its vertical arm, with variable force component represented by the variable buoyancy lift on float 14.

The pontoon 14 need not necessarily be confined to the U-shape disclosed in the several views of the drawings, but conceivably may assume any other convenient contour which will impart a variable buoyancy, progressively increasing with increase in head of impounded waters.

An important feature of my invention is that the gate comprises no elements movable relative to each other. All parts are integrally and permanently secured together. No possibility of disarrangement or disorientation of parts exists. The gate swings as a single entity. Possibility of wear is reduced to a minimum. The only motion of the gate is bodily, relative to the abutments 10, 10, about the trunnions 16, 16.

The action of the gate 12 is as follows: when the head of the water on the upstream side is normal, the weight of the gate proper 13 together with its applied pontoon 14 is sufficient to overcome the counter moment of the counter-weight 15, and to seat the gate on the spillway crest 11. It will be noted that at this time the horizontal projection of arms 19, 19 is at a minimum, so that the moment exacted by counter-weight 15, comprised of a fixed force and variable forearm, is likewise at a minimum. On the other hand, at this time the effective moment arm of gate 13 is at a maximum. The gate is in stable equilibrium, in closed position. Waters can be impounded back of the gate to a substantial and predetermined head disposed somewhere along the extent of the freeboard, intermediate the spillway crest 11 and the dam crest 21. The holding basin is increased to important extent while the operating head is increased, all without appreciable increase in capital investment.

As has been suggested, spillway gates have heretofore been proposed. They are subject to the defect, however, that they must be cracked open in response to upstream water conditions. If such gates are not provided, impounded waters will spill over the crest of the dam. This works injury to the dam, and may result in its failure, unless costly and inefficient construction is utilized. Usually, however, these gates are manually controlled, so that close supervision at all times is required. In remote installations, particularly in the regions of flash floods, this represents an important and frequently prohibitive item of cost. Automatic operation is clearly indicated if only this can be effectively achieved.

In the present embodiment, as the upstream head increases, the design of my dam is such that at first nothing happens, and the gate remains closed, until a determined head is reached. At that point the buoyancy of the pontoon 14, exerted about the same variable moment arm as acts the gate proper 13, cooperates with that of the counter-weight 15 to form a force couple plus a moment, tending to unseat the gate 12 and to rock it counter-clockwise about bearings 16, 16, against the variable moment exerted in a clockwise direction by the gate 13 itself. This counter-clockwise couple tends to crack the gate 12 open to a nicely calculated extent sufficient to spill the impounded waters in excess of the predetermined head, while retaining that desired head by closing upon reduction of head to calculated maximum.

The variable contour of pontoon 14 contributes importantly to the effective action of my gate, since the design is such that effective buoyancy is great at the very outset of increase in upstream head, the rate of increase in buoyancy thereupon dropping with further increase in upstream head. The effect of this is that as the upstream head continues to increase beyond safe limits, the rate at which the gate is opened decreases, and effective provision is made against the possible detrimental effect of flash floods.

It is apparent that no matter how carefully are selected the materials from which the gate is constructed, and no matter how carefully lubricants are applied to the trunnions 16, 16, there is some possibility that over continued use, or even continued periods of non-activity, the gate materials may corrode or the lubricant wash away, or other damage to the gate assembly occur, so that the gate may stick, and refuse to open under the action of the pontoon 14. Such sticking, especially in the absence of an attendant might well prove to be disastrous. To guard against such sticking, and to ensure that the gate will open, even with tendency towards such sticking, when truly emergency conditions arise, I provide an emergency pontoon on the gate 13. While many suitable shapes of such pontoons exist, and while it may be located at a variety of places on the gate 13, and may consist of one or more parts, I prefer to provide a pontoon of linear vertical characteristics, that is, one having the same increment of lift for unit increment in the height of impounded waters, and to apply this pontoon 22 in any desired suitable manner horizontally across the upstream face of gate 13 at the top thereof. The pontoon 22, formed of any suitable material, is constructed as a single unit, extending the entire width of the gate 13.

As the waters increase on the upstream side of gate 13, then if the latter sticks, the pontoon 14 is gradually covered, so that all its buoyant action is made available. Against the sticking however, the pontoon 14 may be insufficient, together with counter-weight 15, to break the gate loose, free to swing. As the head of impounded waters continues to increase, however, the waters reach the auxiliary pontoon 22, and its buoyancy is such that, added to the counter-clockwise moment of pontoon 14 and counter-weight 15, that it ensures that the gate 12 is broken free from its frozen position. Once freed in this manner, the gate swings quickly to its fully open position, and rapidly and effectively spills the excess waters. Once these waters are spilled, the buoyant lift of pontoon 14, and in emergency condition, of auxiliary pontoon 22, is no longer effective. The weight of gate 13 overcomes the counter-balancing effect of counter-weight 15, and the gate is closed ready for further opening cycles when occasion arises. It is entirely within the province of my invention that the main and emergency pontoons be constructed as a single unit, and I have employed such construction in my preferred embodiment.

It is to be noted that when the gate is opened, the opening moments are in large measure supplied by the pontoon, although at such times the effective moment of counter-weight 15, with its variable moment arm, is at a maximum.

I have explained that there are many installations, of some magnitude, where a single spillway cannot be economically designed for maximum efficiency of spilling, and that in such instances a series of spillways can best be employed, each element of the series consisting of one or more spillways. While for symmetry I ordinarily contemplate the same number of spillways in each operating unit of the spillway system, this is by no means an essential, and the number of spillways may vary from unit to unit. In the preferred embodiment, I provide units of one or more spillways 11, each operating unit having varying degrees of sensitivity in response to variations in head. That is, the gates of one operating unit are designated to open and close first, those of the next unit will be more sluggish in response, while those of the next operating unit will be still more sluggish, and so on.

I prefer, other things being equal, to have the unit of greatest sensitivity disposed in the region where the main downstream channel is located. The spillways of the next most sensitive unit flank those of the first-mentioned unit, in the region where the next most important part of the downstream channel is located, and so on. Thus, as flood conditions are first approached the spillways of the first operating unit are cracked open in sensitive response. This may be sufficient to subserve the intended purpose. If so, the gates in the other units, more sluggish in operation, remain closed. After the flood waters subside, the gates of the first unit fall to closed position, and the normal static head of upstream water is re-established.

If, however, the gates of the first unit cannot spill the surplus waters, then as the upstream head continues to build up, the more sluggishly-responsive gates of the next unit begin to crack open, and additional spillway volume is provided. If the volumetric capacity of these, added to that of the first unit of one or more gates, is still insufficient to spill all the excess waters, the rising water level will cause the cracking open of the still more sluggishly-responsive third unit of one or more gates, and so on until all the units are in operation.

Such disposition of gates, disposed in batteries, is disclosed in Figure 4. Therein, it is indicated, in fragmentary perspective view, that I provide five gates in the typical and exemplary embodiment disclosed, three of which are indicated in same detail. Gate No. 3 is disposed about mid-channel and opens at the lowest elevation, as indicated at the upper left in Figure 4. When the head of the up-stream water continues to rise, however, to a height in excess of that which can be effectively spilled by gate No. 3 operating alone, such level being indicated at the upper left of Figure 4, gates Numbers 2 and 4, which are adjusted to work as a battery and which flank gate No. 3, on opposite sides thereof, begin to crack open, thus spilling the excess waters which flow laterally of the main channel. At those ocasional times when even these two series of gates cannot spill sufficient water to maintain the water level constant, or to spill the upstream water at desired rate, and when the up-stream water level continues to rise and reaches the topmost position indicated at the upper left of Figure 4, then gates 1 and 5, operating as a battery, begin to crack open and spill the marginal components of the up-stream water.

The total number of units, as well as the number of spillways within the units, has been so wisely calculated as to ensure that maximum flood conditions can be accommodated without the flood waters cresting the dam.

It is a simple matter to adjust the sensitivity of the gate. This can be accomplished by correlating the several factors of relative lengths of the arms 17 and 18 on the one hand and arms 19, 19 on the other hand, by varying the weight 15; by varying the weight of gate 13; and by changing the contour and volumetric displacement of pontoon 14. In any of these manners, or by any well-chosen combination of any two or more of them, a nice adjustment of the sensitivity of the particular gate can readily be achieved.

It is apparent from the foregoing that my gate is at once rendered extremely inexpensive and rugged, due to its unitary and well-braced construction. It is characterized by its absence of relatively movable parts. The only bearing surfaces are comprised of the trunnions 16, 16. The gate is practically fool-proof, and it is seldom that any parts can get out of order. Should the gate stick following long periods of disuse, the emergency pontoon will assure its breaking free. Once this is accomplished, what lubricant there remains in the bearings will be redistributed, and the gate will now function as well as it did initially. The construction is such that the gate is reliably responsive in fully automatic manner to all variations in water head, and this with controlled and determined sensitivity best suited to the particular operating problems encountered. The gate can be left unattended over long periods of use with assurance that reliable operation will ensue.

By properly positioning the counter-weight 15 and by careful contour of the pontoon 14, it can be ensured that as the gate is cracked open, increasingly large portion of the lifting torque is applied by the counter-weight. This permits the gate 13 and float 14 to lift above the surface of the water and to effect a gate opening greater in magnitude than the rise of the water level in the reservoir. As has been seen, the arrangement of the mechanism is such that a variable rate of lift can be achieved by varying the location of the counter-weight and of the contour of the float, whereby to attain a more rapid rate of gate lift where rapid response is most desirable. To ensure positive closing action, a substantial part of the lifting action remains constantly in the buoyancy of the float.

Moreover, and in addition to its substantial freedom of any likelihood of failure, my new gate construction is immediately and sensitively responsive to even small changes in water level, and is such that full range of gate opening from fully closed to fully open position can be obtained with but small change in water level. All these and many other thoroughly practical advantages attend upon the practice of my invention.

It is apparent from the foregoing that once the broad idea of my invention is disclosed, many embodiments thereof will be suggested to those skilled in the art, all falling within the scope of my basic inventive concept; and that similarly, many modifications of the present embodiment may likewise be evolved. Accordingly, I intend that the foregoing disclosure be considered as purely illustrative, and not by way of limitation.

I claim:

1. The method of controlling the water level in reservoirs through the use of a plurality of spillways controlled by gates which are automatically responsive, each to a different degree, to changes in head in water upstream of the spillways, comprising, opening a determined number of gates, of substantial degree of response, as an incident to increase in head of, and so as to handle the entire excess of water up to a predetermined maximum change of head, and opening a determined number of other gates, of lesser degree of response, when that head is exceeded, as an incident to such increase in head, and so on, upon continued increase in head, until all the gates, including the gates of least degree of response, are opened.

2. The method of controlling the water level in reservoirs through the use of a plurality of spillways controlled by gates which are automatically responsive, each to a different degree, to changes in head of the water upstream of the spillways, and wherein the gates of greatest degree of response and disposed substantially over and in line with the main downstream channel, comprising opening a determined number of gates, being those of greatest degree of response, as an incident to increase in head of, and so as to handle the entire excess of water upstream of the spillways, up to a predetermined maximum head, and opening in response to such increase in head, a determined number of other gates, of lesser degree of response, and disposed laterally of the main downstream channel, when that maximum head is exceeded, and so on, upon continued increase in head, until all the gates, including the gates of least degree of response, are opened.

3. Apparatus for controlling within narrow limits, the head of water in a water-impounding reservoir or the like, whereby excess water is quickly released and the water level within the reservoir is thereupon maintained substantially constant, comprising, in combination, a dam across said reservoir having a plurality of spillways therein, each spillway having therein and operably connected thereto a spillway gate comprising a frame having the general shape of a bell-crank lever, and being fulcrumed at opposite sides of its apex, and extending across the spillway and pivoted at its fulcrum points to its associated spillway, an outwardly convex gate fast on the end of the long arm of the frame and having a pontoon applied across its face, contoured so as to provide progressively lesser positive increment of buoyancy as the upstream head of water increases, and a counter-weight on the end of the short arm of the frame.

4. Apparatus for controlling within narrow limits, the head of water in a water-impounding reservoir or the like, whereby excess water is quickly released and the water level within the reservoir is thereupon maintained substantially constant, comprising, in combination, a dam across said reservoir having a plurality of spillways therein, each spillway having therein and operably connected therewith a spillway gate comprising a frame having the general shape of a bell-crank lever, and being fulcrumed at its apex, and extending across the spillway and pivoted at its fulcrum points to its associated spillway, an outwardly convex gate fast on the end of the long arm of the frame and having a pontoon applied across its face, contoured so as to provide progressively lesser positive increment of buoyancy as the upstream head of water increases, a counter-weight on the end of the short arm of the frame, and an emergency pontoon applied horizontally across the top of the gate, at the upstream side thereof.

5. Apparatus for controlling within narrow limits in a water-impounding reservoir or the like, for quickly releasing excess head of water in the reservoir and thereupon restoring the water level to constant level, comprising a dam having a plurality of spillways therein, a gate provided in each said spillway and adapted to open automatically upon variation in the upstream head of water so as to maintain such head within narrow limits, comprising upwardly swingable means for barring in controlled manner the passage of water through the spillway, means operably connected with said first-mentioned means for imparting thereto a buoyancy determined over a continuous range by the upstream head of water, and means likewise operably connected to said first-mentioned means for cooperating with said second-mentioned means to provide a force couple tending to move the first-mentioned means in response to change in upstream water head, the said gates being divided into batteries, each battery comprising one or more said gates, the gates of each battery being of different degrees of response to change in upstream water head, the battery comprising gates of greatest degree of response being located over the main downstream channel and opening first, and handling excess water up to a predetermined maximum head, the battery comprising gates of next greatest degree of response flanking the first-mentioned battery and opening upon increase in head beyond said maximum, and so on, upon continued increase in upstream head of water, until all of the batteries of gates, including the least-responsive gates, disposed remote from said downstream channel, are opened.

JOHN S. HALE.

REFERENCES CITED

The following references are of record in the file of this patent:

FOREIGN PATENTS

| Number | Country | Date |
|---|---|---|
| 194,382 | Switzerland | 1938 |